United States Patent [19]

Schmitter et al.

[11] Patent Number: 5,099,667
[45] Date of Patent: Mar. 31, 1992

[54] SYSTEM FOR SUSPENDING AND APPLYING SOLID LUBRICANTS TO TOOLS OR WORK PIECES

[75] Inventors: René Schmitter, Bartenheim, France; Marco Lanini, Sins, Switzerland

[73] Assignee: Lonza Ltd., Gampel, Switzerland

[21] Appl. No.: 596,379

[22] Filed: Oct. 11, 1990

Related U.S. Application Data

[62] Division of Ser. No. 539,339, Jun. 18, 1990.

[30] Foreign Application Priority Data

Jun. 16, 1989 [CH] Switzerland .......................... 2262/89
Nov. 15, 1989 [CH] Switzerland .......................... 4112/89

[51] Int. Cl.$^5$ ............................................. B21B 45/02
[52] U.S. Cl. ........................................... 72/44; 72/236
[58] Field of Search .................... 72/44, 43, 45, 236; 184/6.26, 55.1; 252/29, 23

[56] References Cited

U.S. PATENT DOCUMENTS

| | | | |
|---|---|---|---|
| 679,756 | 8/1901 | Kennedy et al. | |
| 998,762 | 7/1911 | Faller | |
| 1,577,052 | 3/1926 | Auspitzer | |
| 1,690,669 | 11/1928 | China | |
| 1,944,273 | 1/1934 | Rutherford | 87/9 |
| 1,987,724 | 1/1935 | Tolman | 83/13 |
| 2,176,879 | 10/1939 | Bartell | 44/9 |
| 2,234,971 | 3/1941 | Kelso | 80/13 |
| 2,316,571 | 4/1943 | Donmire et al. | 72/44 |
| 2,588,625 | 3/1952 | Ferner et al. | 117/49 |
| 2,719,386 | 10/1955 | Johnson et al. | 49/82 |
| 2,735,814 | 2/1956 | Hodson et al. | 252/30 |
| 3,198,735 | 8/1965 | Lamson et al. | 252/25 |
| 3,213,024 | 10/1965 | Blake et al. | 252/33.3 |
| 3,242,075 | 3/1966 | Hunter | 252/22 |
| 3,341,454 | 9/1967 | Chor et al. | 252/22 |
| 3,344,065 | 9/1967 | Gansheimer et al. | 252/18 |
| 3,384,581 | 5/1968 | Peace | 252/29 |
| 3,472,770 | 10/1969 | Preston et al. | 252/23 |
| 3,525,692 | 8/1970 | Dodson et al. | 252/29 |
| 3,549,206 | 12/1970 | Reuter | 302/53 |
| 3,577,754 | 5/1971 | Calmes | 72/45 |
| 3,698,953 | 10/1972 | Eisenberg | 136/20 |
| 3,770,634 | 11/1973 | Dodson et al. | 252/29 |
| 3,801,504 | 4/1974 | Stone | 252/23 |
| 3,806,453 | 4/1974 | McDole | 252/22 |
| 3,833,402 | 9/1974 | Leary et al. | 252/49.5 |
| 3,838,048 | 9/1974 | Hedge et al. | 252/12 |
| 3,857,102 | 12/1974 | Cavalluci | 51/9 R |
| 3,908,038 | 9/1975 | Nienart et al. | 427/27 |
| 3,918,284 | 11/1975 | Reiley et al. | 72/97 |
| 3,919,158 | 11/1975 | Randell | 260/30.6 |
| 3,944,144 | 3/1976 | Okada et al. | 241/22 |
| 3,983,042 | 9/1976 | Jain et al. | 252/18 |
| 4,022,043 | 5/1977 | Chevet | 72/97 |
| 4,039,337 | 8/1977 | Brown et al. | 106/38.28 |
| 4,050,932 | 9/1977 | Lemmer | 75/211 |
| 4,052,323 | 10/1977 | Feneberger et al. | 252/23 |
| 4,055,025 | 10/1977 | Seese et al. | 51/411 |
| 4,055,503 | 10/1977 | Anselment et al. | 252/12 |
| 4,090,666 | 5/1978 | Peck | 239/15 |

(List continued on next page.)

FOREIGN PATENT DOCUMENTS

295268 10/1969 Australia .

OTHER PUBLICATIONS

Boundy and Boyers, "Styrene, Its Polymers, Copolymers and Derivatives", Reinhold Publishing Corp., NY 1952, pp. 859-860.

*Primary Examiner*—Lowell A. Larson
*Assistant Examiner*—Michael J. McKeon
*Attorney, Agent, or Firm*—Fisher, Christen & Sabol

[57] ABSTRACT

A system for preparing and applying a lubricant suspension containing graphite to tools or workpieces used in the thermal deformation of metals. The system includes a suspending device and an application device. A device for suspending solid lubricants, especially graphite-containing solid lubricants, in a carrier liquid, especially water. The essential element of the device is a ring nozzle downstream from which is a dispersing unit. A device for applying lubricant suspensions containing graphite to tools or workpieces in the thermal deformation of metals. The device has a suitable distributor which comprises one or more spray units.

19 Claims, 6 Drawing Sheets

| | | | |
|---|---|---|---|
| 4,104,178 | 8/1978 | Jain et al. | 252/30 |
| 4,115,283 | 9/1978 | Needham | 252/12.4 |
| 4,140,734 | 2/1979 | Marcantonio et al. | 428/419 |
| 4,201,070 | 5/1980 | Seaton et al. | 72/45 |
| 4,206,060 | 6/1980 | Yamamoto et al. | 252/22 |
| 4,206,061 | 6/1980 | Dodson et al. | 252/29 |
| 4,228,020 | 10/1980 | Papay | 252/29 |
| 4,297,231 | 10/1981 | Kahara et al. | 252/182.1 |
| 4,314,907 | 2/1982 | Defretin et al. | 252/22 |
| 4,321,295 | 3/1982 | Smith-Johannsen | 428/206 |
| 4,333,275 | 6/1982 | Bernot | 51/320 |
| 4,339,897 | 7/1982 | Thompson et al. | 51/436 |
| 4,351,815 | 9/1982 | Glasstetter et al. | 423/445 |
| 4,357,249 | 11/1982 | Mellor | 252/12 |
| 4,357,953 | 11/1982 | Patterson | 137/88 |
| 4,452,169 | 6/1984 | Matsuda | 118/50 |
| 4,454,173 | 6/1984 | Koga | 427/235 |
| 4,456,539 | 6/1984 | Shim | 252/46.7 |
| 4,470,939 | 9/1984 | Schoolcraft | 264/104 |
| 4,482,275 | 11/1984 | Shinozaki et al. | 406/12 |
| 4,490,077 | 12/1984 | Shimada et al. | 406/14 |
| 4,535,812 | 8/1985 | Miller | 137/624 |
| 4,575,430 | 3/1986 | Periard et al. | 252/12.6 |
| 4,622,709 | 11/1986 | Matsuda | 4/255 |
| 4,656,105 | 4/1987 | Kobayashi et al. | 429/192 |
| 4,668,534 | 5/1987 | Gray | 427/183 |
| 4,687,598 | 8/1987 | Varma | 252/518 |
| 4,702,860 | 10/1987 | Kinderov et al. | 252/511 |
| 4,710,307 | 12/1987 | Periard et al. | 252/18 |
| 4,735,734 | 4/1988 | Staub et al. | 252/22 |
| 4,790,263 | 12/1988 | Eckert et al. | 118/317 |
| 4,795,495 | 1/1989 | Dobson | 134/8 |
| 4,808,324 | 2/1989 | Periard et al. | 252/23 |
| 4,819,471 | 4/1989 | Cook | 72/214 |
| 4,862,838 | 8/1989 | Hodgkins et al. | 29/513 |
| 4,912,955 | 4/1990 | Stines | 72/45 |

FOREIGN PATENT DOCUMENTS

| | | | |
|---|---|---|---|
| 0133937 | 3/1985 | European Pat. Off. | |
| 164637 | 5/1985 | European Pat. Off. | |
| 0169413 | 1/1986 | European Pat. Off. | |
| 0250881 | 1/1988 | European Pat. Off. | |
| 2104041 | 1/1971 | Fed. Rep. of Germany | |
| 245716 | 11/1975 | Fed. Rep. of Germany | |
| 2430249 | 2/1976 | Fed. Rep. of Germany | |
| 2823092 | 1/1978 | Fed. Rep. of Germany | |
| 2921620 | 1/1979 | Fed. Rep. of Germany | |
| 3429524 | 2/1986 | Fed. Rep. of Germany | |
| 103203 | 7/1980 | Japan | |
| 56-9008 | 1/1981 | Japan | |
| 0139212 | 10/1981 | Japan | 72/45 |
| 145503 | 12/1981 | Japan | |
| 58-48361 | 1/1983 | Japan | |
| 58-116910 | 7/1983 | Japan | |
| 0167018 | 10/1983 | Japan | 72/43 |
| 18799 | 1/1984 | Japan | |
| 596294 | 3/1978 | Switzerland | |
| 609728 | 3/1979 | Switzerland | |
| 586195 | 5/1976 | U.S.S.R. | |
| 981351 | 5/1982 | U.S.S.R. | |
| 1030405 | 7/1983 | U.S.S.R. | |
| 1251044 | 10/1971 | United Kingdom | |
| 2036071 | 6/1980 | United Kingdom | |
| 2163691 | 3/1986 | United Kingdom | |

OTHER PUBLICATIONS

Ritzharteprufer nach Sikkens, Typ 601", (Erichsen, Gruppe 14, 601 D, Jun. 1976.

Chem. Abstracts, vol. 81, (1984), 109708k.

Chem. Abstracts, vol. 102, (1985), 175011f.

Vlasov, T. F., et al., "Stal", (Steel In The USSR), (Feb. 1974), pp. 153-154.

Meleshko, V. I., et al., "Stal", (Steel In The USSR), (10), 1079, 765-769.

SYSTEM FOR SUSPENDING AND APPLYING SOLID LUBRICANTS TO TOOLS OR WORK PIECES

This is a divisional of application Ser. No. 539,339, filed on June 18, 1990 of Rene SCHMITTER.

BACKGROUND OF THE INVENTION

1. Field of the Invention

The invention relates to a new system for lubricating tools, such as, rolls, or work pieces, such as, metal sheets or profiles, in the hot metal forming area, and to a process of using such new system.

The invention also relates to a new device for suspending solid lubricants, especially solid lubricants containing graphite and polymers, in a carrier liquid, especially water, and to the related suspending process.

The invention further relates to a new device for applying lubricant suspensions containing graphite to tools or workpieces used in thermal deformation of metals, especially in the hot-rolling of sheet, shapes or pipe.

2. Background Art

From U.S. Pat. No. 4,735,734, the arrangement of a colloid mill and a downstream intensive mixer to mix solid lubricants in a carrier liquid, in particular water, is known. But it has been shown that no homogeneous solid lubricant suspension can be obtained with this known device. The drawback especially is that in the individual mixing devices, above all in the colloid mill, lump formation occurs, which makes an efficient operation impossible.

In a previous process, either lubricant was completely dispensed with or oil emulsions were applied to the hot workpieces and tools. If no lubrication takes place, a great wear of tools, e.g., rollers, results. A high replacement rate of the tools and a large expense are connected with that result.

Oil lubrication has the disadvantage that the oil burn on the hot tool and, thus, leads to smoke emissions that are undesirable and also even injurious to health. Moreover, oil, in regard to lubricating properties, is substantially poorer than graphite. The application of the oil emulsion so far took place in a more or less uncontrolled manner with the usual application systems, such as, nozzles, very often together with the application of cooling water.

BROAD DESCRIPTION OF THE INVENTION

An object of the invention is to provide a system and devices which eliminate the above-mentioned disadvantages. Other objects and advantages of the invention are set out herein or are obvious herefrom to one skilled in the art. The object of the invention is achieved with the invention device and the invention process.

The invention involves a system for preparing and applying a lubricant suspension containing graphite to tools or workpieces used in the thermal deformation of metals, comprising:

(a) a device for suspending graphite-containing solid lubricants in a carrier liquid, the device including a ring nozzle and a downstream dispersing unit; and (b) a device for applying the lubricant suspension containing graphite to the tools or workpieces, the device including a distributor which has one or more spray units.

The invention also involves a process for using the invention system for lubricating such tools or workpieces.

The invention involves a device for suspending graphite-containing solid lubricants in a carrier liquid. The device includes a ring nozzle and a downstream dispersing unit.

The device preferably has an intensive mixer connected to the dispersing unit. Preferably the ring nozzle has a cylindrical form bent toward the dispersing unit, and, on the upper part of the ring nozzle, has an intake for the solid lubricant and an intake slot for the carrier liquid. Preferably the intake slot for the carrier liquid is adjustable. The intake for the solid lubricant preferably is fed by a conveying device from a storage tank. Preferably the intake for the solid lubricant is over the intake slot for the carrier liquid and is centered relative to the cross section of the ring nozzle. Preferably a stirrer is placed downstream from the intensive mixer.

The invention also involves a process for suspending graphite-containing solid lubricants in a carrier liquid. In the process, the suspending takes place in the invention device.

In the process, preferably the solid lubricant is guided centrally in the upper part of the ring nozzle by a conveying device over an intake for the solid lubricant, falls down, and is taken by the carrier liquid film, which is formed by the intake slot for the carrier liquid, on the lower part of the ring nozzle, and is fed to the dispersing unit. Preferably water is used as the carrier liquid. Preferably a suspension of a graphite-containing solid lubricant in a carrier liquid is prepared by suspending the graphite-containing solid lubricant in the carrier liquid by means of the invention device wherein the solid lubricant is over the intake for the liquid carrier and is centered relative to the cross section of the ring nozzle.

The invention involves a device for applying lubricant suspensions containing graphite to tools or workpieces used in the thermal deformation of metals. The device includes a distributor, which has one or more spray units.

In the invention device, preferably the distributor has a cylindrical shell mold. Preferably the distributor exhibits a chamber. Preferably the distributor is divided into several chambers so that each spray unit or specific groups of spray units belong to one chamber. Preferably the distributor is fastened in holders so that it can be fixed stationary or rotatable around the longitudinal axis of the distributor and can be fixed at specific angles to the longitudinal axis. Preferably the distributor is fastened in a holder so that is movable in the longitudinal axis of the distributor. Preferably the distributor is connected to a control and distributor unit, which is provided with a programmable control, and which is a unit to which a high-pressure and filter part is connected. The spray unit preferably includes a housing with a product intake, a spray head with a hole-type nozzle of a closing device and a screening device.

The invention also involves the use of one or more of the invention devices for applying lubricants containing graphite to tools and workpieces used in the hot-rolling of sheet, shapes or pipes.

Figure 1:
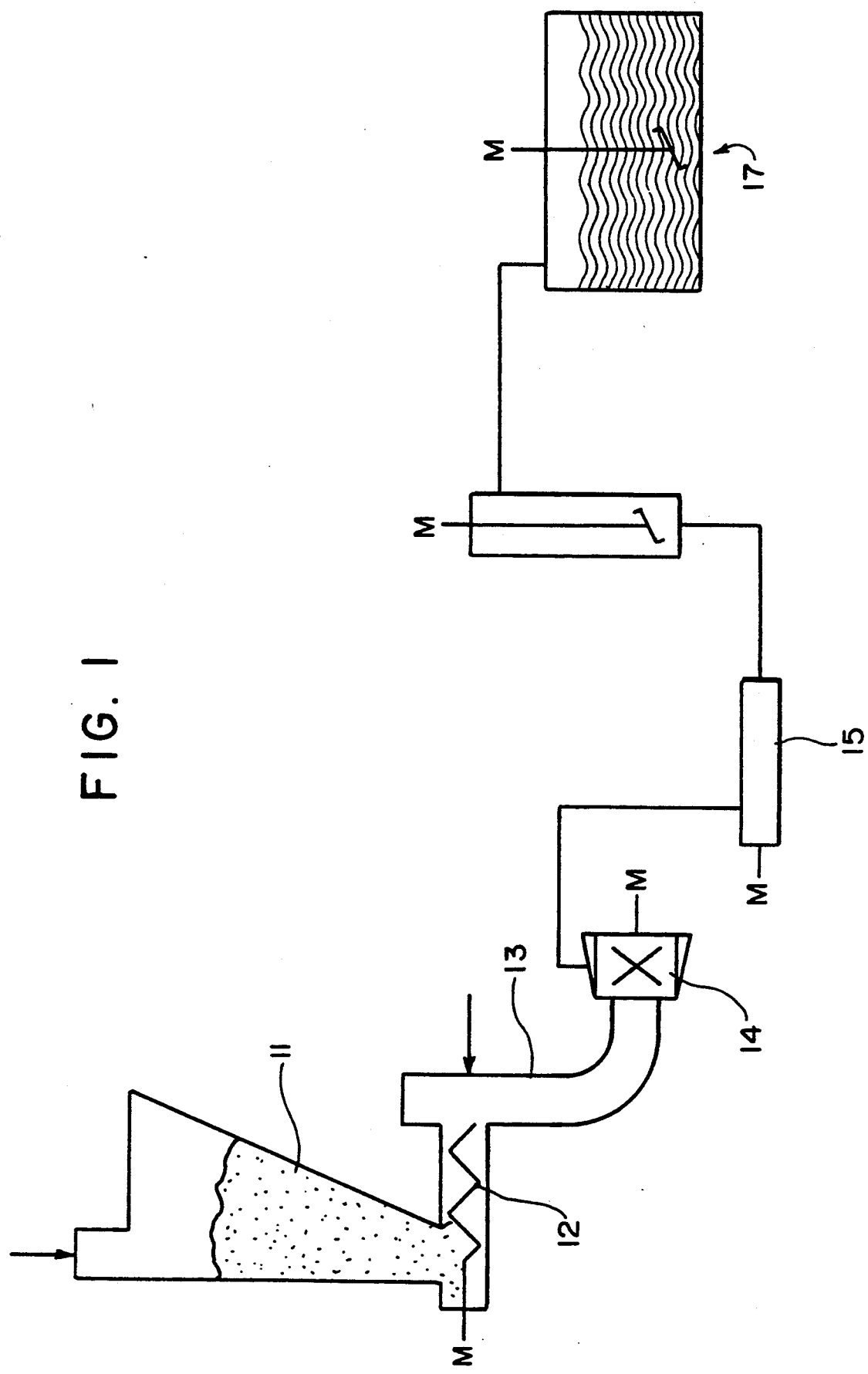
FIG. 1 diagrammatically shows an embodiment of the suspending unit of the invention, which has:
solid lubricant receiver (11)
Figure 2:
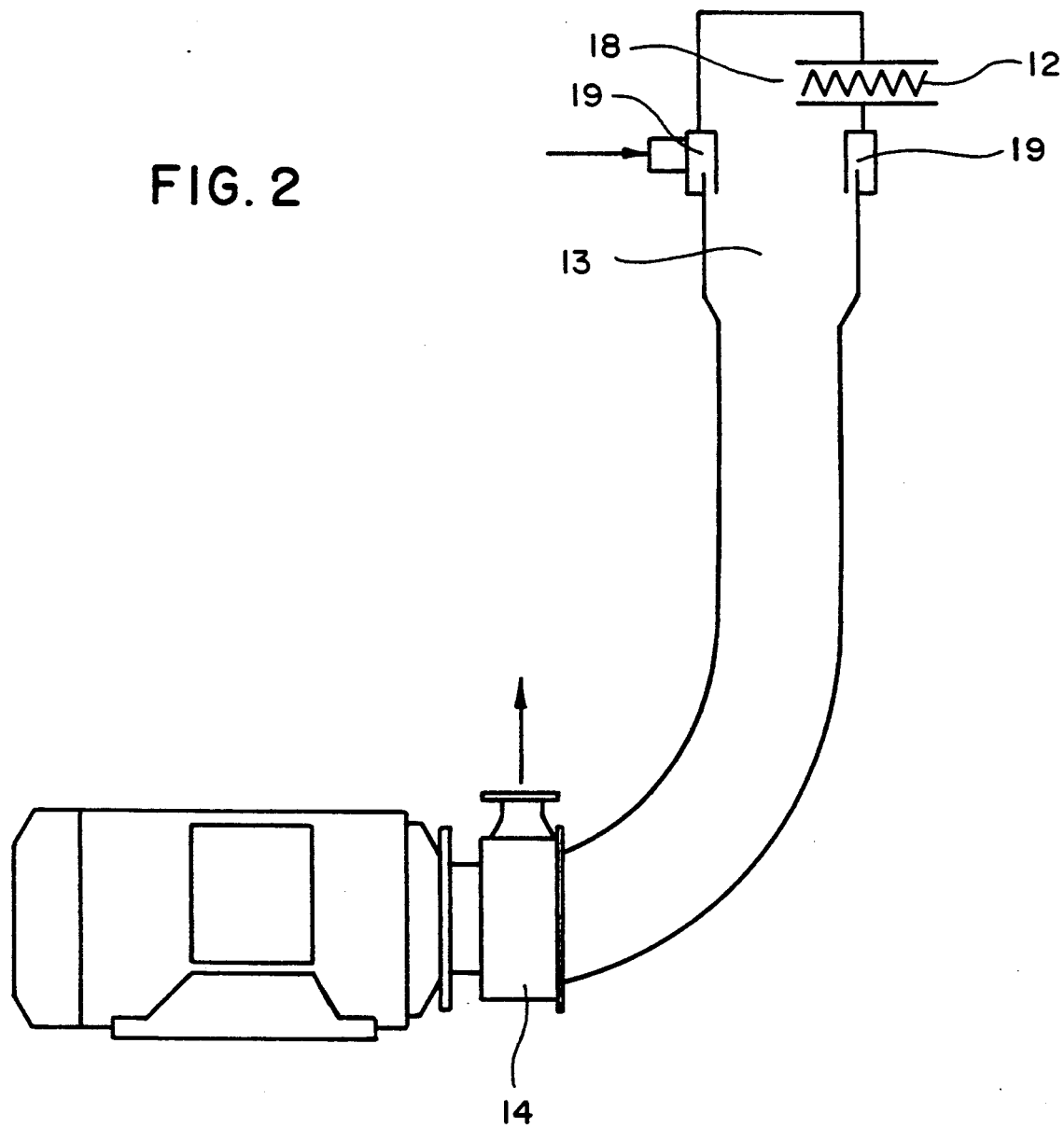
Figure 3:
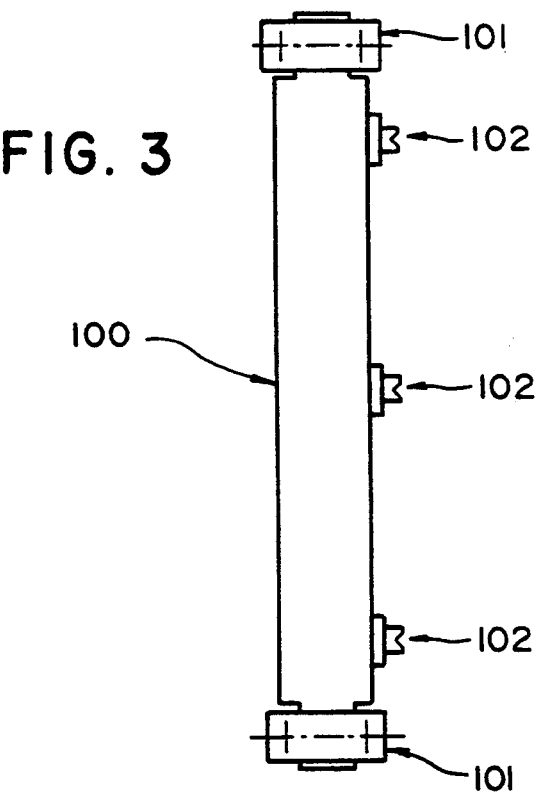
Figure 4:
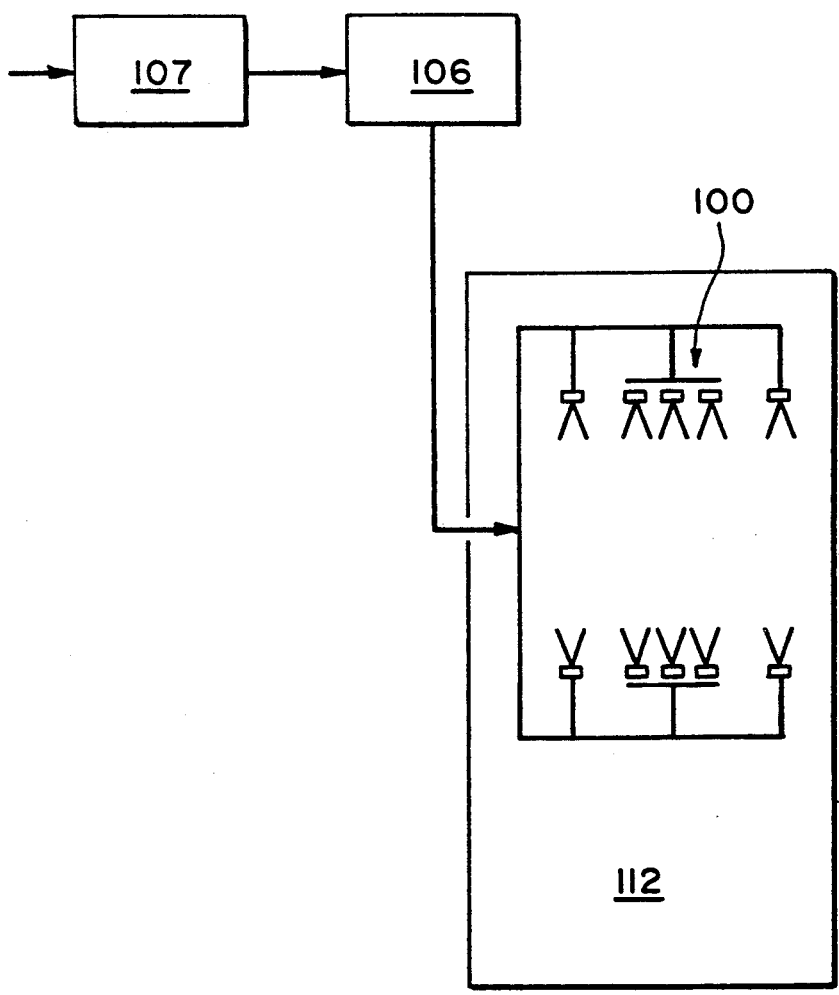
Figure 5:
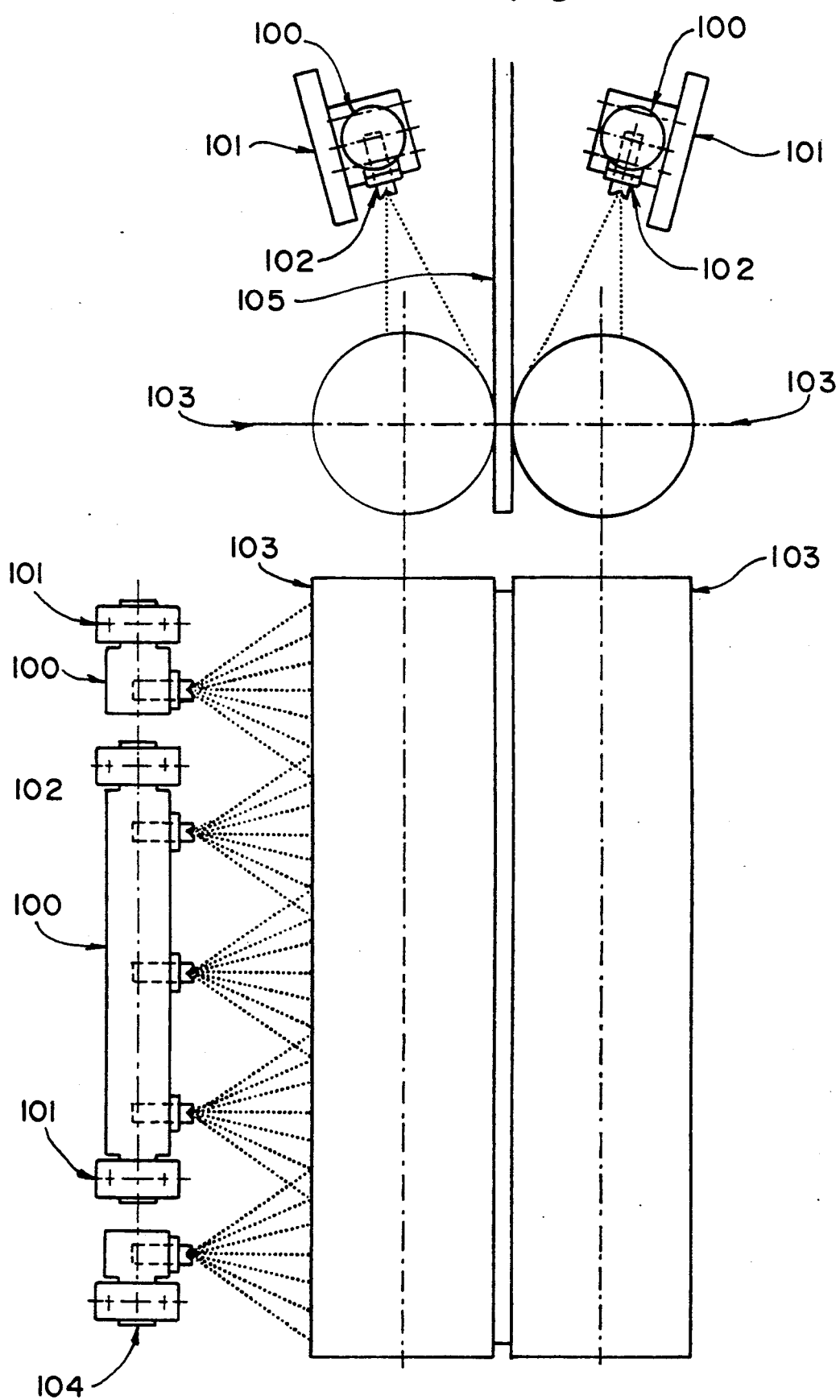
Figure 6:
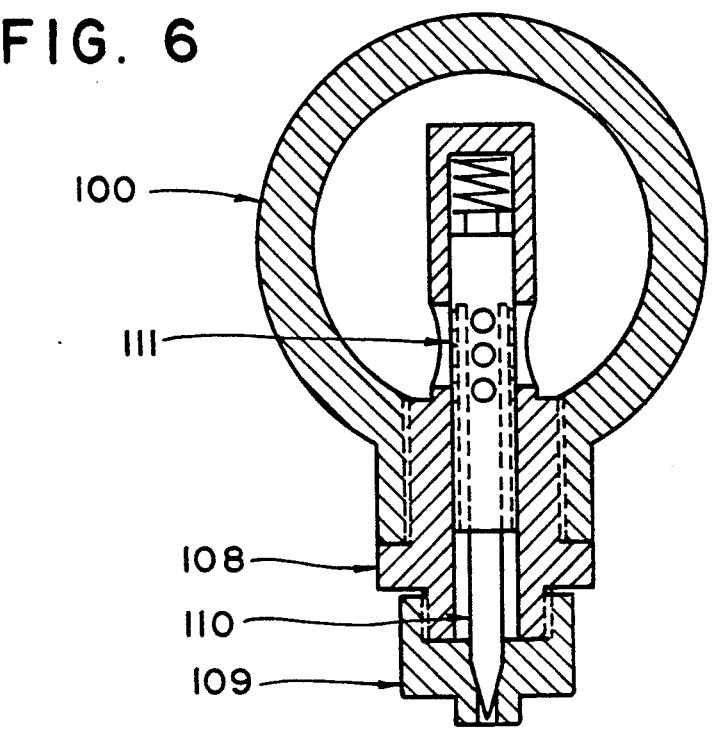
Figure 7:
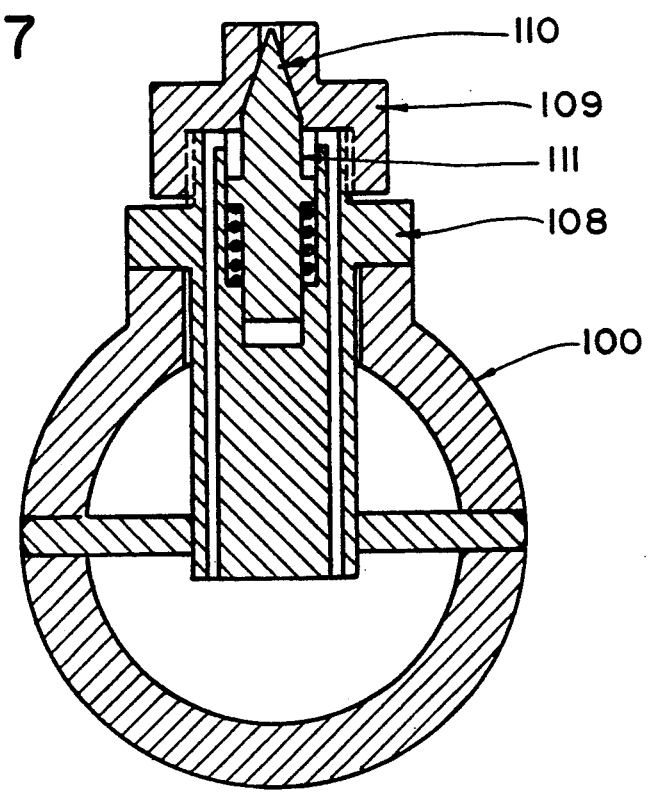
Figure 8:
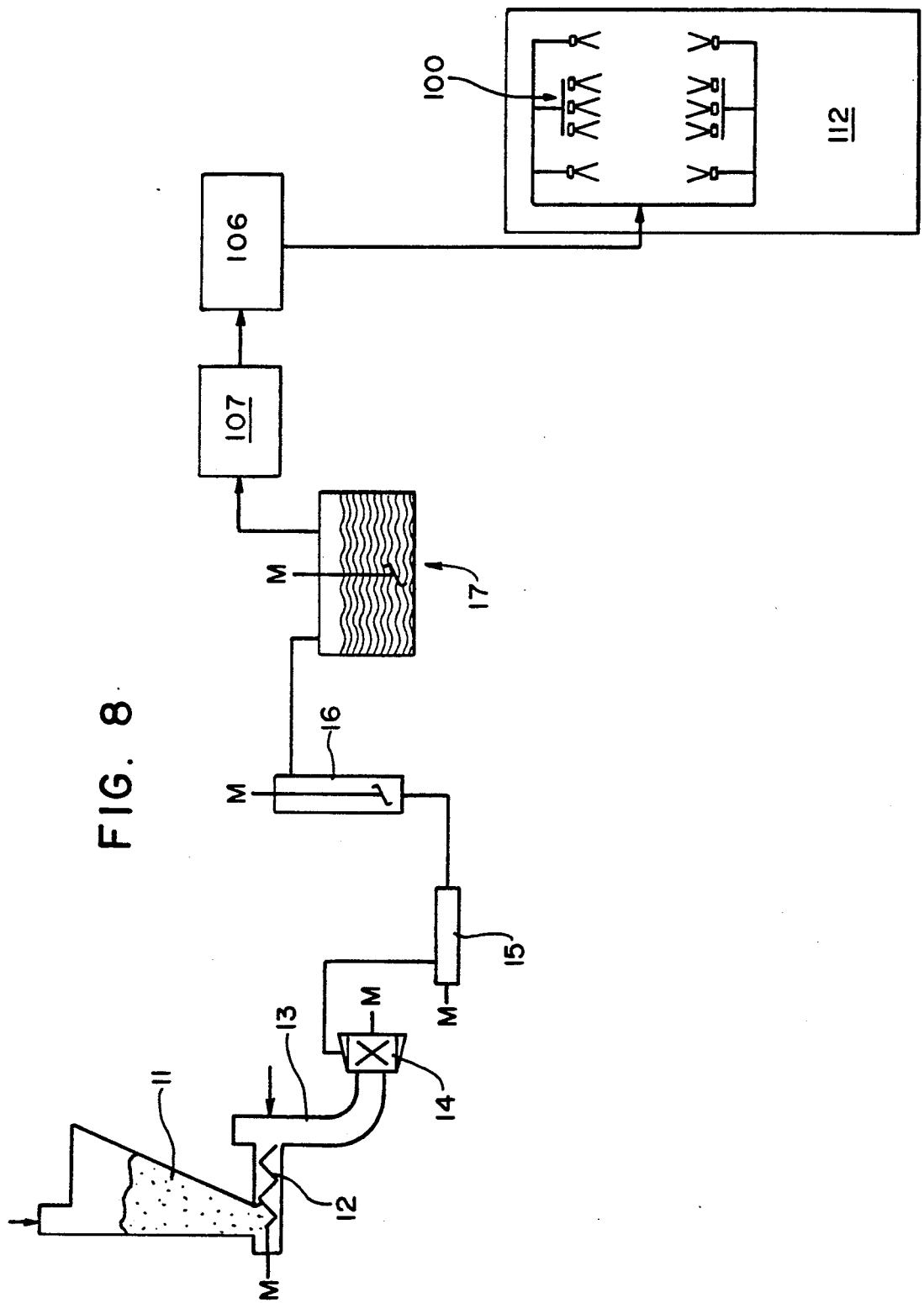

conveying device (12)
ring nozzle (13)
dispersing unit (14)
conveying unit (15)
intensive mixer (16)
stirrer (17);

FIG. 2 diagrammatically shows ring nozzle 13, which additionally contains:
intake for the solid lubricant (18)
intake slot for the carrier liquid (19)
motor drives, each designated by M;

FIG. 3 diagrammatically shows an example of the application device according to the invention having distributor 100, in holders 101, which comprises three spray units 102;

FIG. 4 diagrammatically shows the application device according to the invention in which several distributors 10 are connected in a rolling stand with a control and distributor unit 106 and a high pressure and filter unit 107;

FIG. 5 shows a front and side view of a device according to the invention used in the hot rolling of sheet:
101 identifies in this case the holders
102 identifies in this case the spray units
103 identifies in this case the rollers (upper and lower roller)
104 identifies in this case the longitudinal axis of the distributor
105 identifies in this case the sheet;

FIG. 6 shows a spray unit in cross section, consisting of
distributor 100
housing for product intake 108
spray head with hole-type nozzle 109 screening device 111
closing device 110;

FIG. 7 shows a spray unit in cross section consisting of one distributor with two chambers, with the remaining references corresponding to FIG. 6; and FIG. 8 diagrammatically shows an embodiment of the lubricating system of the invention.

DETAILED DESCRIPTION OF THE INVENTION

The suspending device according to the invention essentially consists of ring nozzle 13 and downstream dispersing unit 14. Ring nozzle 13 advantageously is made cylindrical in the shape of a pipe bent against dispersing unit 14. Intake 18 for the solid lubricant, as well as intake slot 19 for the carrier liquid, is placed on the upper part of ring nozzle 13. Preferably, intake 18 for the solid lubricant is placed above intake slot 19 for the carrier liquid. The opening of intake 18 for the solid lubricant preferably is centered in the center of the pipe, so that the solid lubricant first can enter without touching the walls of ring nozzle 13. An adjustable intake slot 19 for the carrier liquid is provided. The amount and the film thickness of the carrier liquid film flowing along in the walls of ring nozzle 13 thus can be influenced. The intake for the solid lubricant is suitably fed by a suitable conveying device 12, e.g., a conveying screw, from a storage tank 11. As dispersing device 14, commercially available devices, which are able to exert a great shearing force on the solid suspension, can be used. Directly after dispersing unit 14, an intensive mixer 16 can be located downstream, which makes another contribution to stabilizing the suspension. In addition, conveying device 15, e.g., a pump, can be incorporated between dispersing unit 14 and intensive mixer 16. The retention time of the suspension in intensive mixer 16 is adjusted by means of pump 15. Suitable representatives of intensive mixers are, e.g., mixers with agitator blade shafts rotating in the same or the opposite direction, stirred ball mills, beam mixers or screw mixers.

In a preferred arrangement, another stirrer 17 is located downstream from the intensive mixer. This arrangement advantageously can be provided with a level control, which is able to turn the unit on or off at the appropriate level.

The process according to the invention is broadly recited above and is explained by the above-mentioned features of th invention device.

The solid lubricants suitably are those which contain a substantial portion of graphite, polymers and optionally other additives. Such solid lubricants are known, e.g., from U.S. Pat. No. 4,052,323 or from U.S. Pat. No. 4,808,324. Water suitably is used as the carrier liquid, to which optionally suitable additives, such as, wetting agents, are added.

The lubricant suspensions produced according to the process according to the invention, using the device according to the invention, are used mainly in noncutting hot metal forming to lubricate the tools (which are at temperatures between 50° and 300° C.), such as, mandrels, mandrel rods and rollers, and/or workpieces (which are at temperatures between 800° and 1200° C.), such as, pipes, hollow billets and sheets.

In the application device according to the invention, distributor 100 advantageously exhibits a mold which, e.g., can be configured cylindrical. Spray units 102 are suitably connected compression-proof by means of a screw connection or a suitable coupling system with distributor 100. Numerous embodiments of spray units 102 are described in the art can be used. Spray units 102, as they are described, e.g., in German PS 2,724,931, in European Published Patent Application No. 39839 or European Patent Specification No. 131120, are suitably used for the application device according to the invention. Two embodiments are represented in FIGS. 6 and 7. The number of spray units 102 per distributor 100 is governed by the respective use of the device.

For example an arrangement as represented in FIG. 4 can be used for rolling sheet of a width of about 0.5 m to 2 m. In this example, three distributors 100 are used per roller, and two outside distributors 100 per spray unit and a middle distributor 100 comprise three spray units.

Distributor 100 can contain one or more chambers. If distributor 100, as represented in FIG. 3, consists of one chamber, all spray units 102 are uniformly supplied with lubricant suspension containing graphite.

But, as shown in the FIG. 7, the distributor can also be divided into several chambers so that a separate chamber is allocated to each spray unit 102 or a group of spray units 102. With such a division, it is possible to achieve operation such that not all spray units 102 work simultaneously, but that the spraying with the lubrication suspension takes place selectively, i.e., at the right time and in the right amount and only where necessary. Unnecessary loss of product and cost savings are, therefore, possible.

Further, it is advisable to support the distributor 100 stationary in a suitable holder 101 or rotatable around longitudinal axis 104 of the distributor 100 and able to be fixed at specific angles to the respective axis. Also, one can configure the holders 101 in a movable way in longitudinal axis 104 of the distributor. An exact alignment of spray units 102 placed on distributor 100 with the tool or work surface to be sprayed is thus achievable. The rotation movement can take place in this case with a motor drive by a usual scheme of control.

Supplying of distributor 100 and spray units 102 with the lubrication suspension containing graphite takes place from a tank, for example, a stirred tank 17 as shown in FIG. 7, which contains the lubrication suspension containing graphite by means of a high-pressure and filter part 107 and a control and distributor unit 106 provided with a programmable control. In this case, the feed pressure is between 20 and 100 bars. The high-pressure part suitably uses of a commercial piston pump, to which preferably a continuously operating rotary filer is connected, e.g., according to U.S. Pat. No. 4,217,220. The filter has the task of removing coarse particles from the suspension.

Control and distributor unit 106 consists essentially of a commercial programmable control, provided with the usual control and measuring devices, which has the function of supplying the lubrication suspension in the right amount, at the right time and with the desired pressure first to the distributor 100 and then to individual spray units 102.

Also, the pressure relief and the flushing of the system are regulated by control and distributor unit 106.

In the application device according to the invention, suspensions containing graphite are advantageously used as they are described in U.S. Pat. No. 4,052,323 or in U.S Pat. No. 4,808,324.

The application device according to the invention, therefore, is suitable especially for the spraying of flat rollers in the rolling of sheet, for the spraying of shape rollers in the rolling of special shapes, such as, rails, for the spraying of rollers in the rolling of shapes, such as, H and I beams, or for the spraying of rollers in the rolling of seamless pipes.

The complete system of the invention is shown in FIG. 8, which is a combination of the invention suspending device and the invention application device. The invention system/apparatus has the advantages of the individual component devices and of the combination thereof.

What is claimed is:

1. Device for applying a lubricant suspension containing graphite to a tool or workpiece used in the thermal deformation of metal, comprising a distributor, which comprises one or more spray units, said distributor being fastened in holders so that said distributor can be fixed stationary or rotatable around the longitudinal axis of said distributor and can be fixed at specific angles to said longitudinal axis.

2. Device according to claim 1 wherein said distributor exhibits a cylindrical shell mold.

3. Device according to claim 2 wherein said distributor exhibits a chamber.

4. Device according to claim 2 wherein said distributor is divided into several chambers so that each of said spray unit or specific groups of said spray units belong to one of said chambers.

5. Device according to claim 2 wherein said distributor is connected to a control and distributor unit, which is provided with a programmable control, and which is a unit to which a high-pressure and filter part is connected.

6. Device according to claim 1 wherein said distributor is fastened in a holder so that it is movable along said longitudinal axis of said distributor.

7. Device according to claim 1 wherein said spray unit includes a housing with a product intake, a spray head with a hole-type nozzle with a closing device and a screening device.

8. Device according to claim 1 wherein said distributor exhibits a chamber.

9. Device according to claim 1 wherein said distributor is divided into several chambers so that each of said spray units or specific groups of said spray units belong to one of said chambers.

10. Device according to claim 1 wherein said distributor is connected to a control and distributor unit, which is provided with a programmable control, and which is a unit to which a high-pressure and filter part is connected.

11. Process comprising applying a lubricant suspension containing a lubricant using one or more of the devices according to claim 1 to a tool or a workpiece used in the hot-rolling of sheets.

12. A system for preparing and applying a lubricant suspension containing graphite to a tool or a workpiece used in the thermal deformation of metal, comprising:
    (a) a first device for suspending graphite-containing solid lubricants in a carrier liquid, the first device including a ring nozzle, and a downstream dispersing unit; and
    (b) a second device for applying the lubricant suspension containing graphite to the tool or workpiece, the second device having a distributor, which comprises one or more spray units, said distributor being fastened in holders so that said distributor can be fixed stationary or rotatable around the longitudinal axis of said distributor and can be fixed at specific angles to said longitudinal axis.

13. System according to claim 12 wherein said distributor exhibits a cylindrical shell mold.

14. Device according to claim 12 wherein said distributor exhibits a chamber.

15. System according to claim 12 wherein said distributor is divided into several chambers so that each of said spray units or specific groups of said spray units belong to one of said chambers.

16. System according to claim 12 wherein said distributor is fastened in a holder so that it is movable along said longitudinal axis of said distributor.

17. System according to claim 12 wherein said distributor is connected to a control and distributor unit, which is provided with a programmable control, and which is a unit to which a high-pressure and filter part is connected.

18. System according to claim 12 wherein said spray unit includes a housing with a product intake, a spray head with a hole-type nozzle with a closing device and a screening device.

19. Process comprising applying a lubricant suspension containing a lubricant using the system according to claim 12 to a tool or a workpiece used in the hot-rolling of sheet or pipes.

* * * * *